United States Patent [19]

Koch

[11] Patent Number: 4,705,575
[45] Date of Patent: Nov. 10, 1987

[54] PROCESS AND ARRANGEMENT FOR SEPARATING CERAMIC NUCLEAR FUELS FROM METALLIC CASING OR SUPPORT MEMBERS

[75] Inventor: Rudiger Koch, Aachen, Fed. Rep. of Germany

[73] Assignee: Kernforschungsanlage Julich Gesellschaft mit beschrankter Haftung, Fed. Rep. of Germany

[21] Appl. No.: 711,075

[22] Filed: Mar. 12, 1985

[51] Int. Cl.⁴ ............................................. B08D 9/04
[52] U.S. Cl. .................. 134/24; 134/167 R; 134/169 R; 15/392
[58] Field of Search .................. 134/10, 22.18, 21, 24, 134/16, 167 R, 169 R; 122/390, 391, 38, 392, 382; 15/316 A, 316 R; 210/767, 800, 803

[56] References Cited

U.S. PATENT DOCUMENTS

| | | | |
|---|---|---|---|
| 3,985,572 | 10/1976 | Petermann et al. | 134/34 |
| 4,011,100 | 3/1977 | Ross | 134/8 |
| 4,424,769 | 1/1984 | Charamathieu et al. | 122/292 |
| 4,452,183 | 6/1984 | Yazidjian | 122/392 |

Primary Examiner—John Doll
Assistant Examiner—Sharon T. Cohen
Attorney, Agent, or Firm—Scully, Scott, Murphy & Presser

[57] ABSTRACT

A process for separating ceramic nuclear fuels out of metallic support members or support member parts in which there adhere the nuclear fuels, especially subsequent to the burning down of the nuclear fuels in nuclear reactors. The ceramic nuclear fuels are washed off from the support member or carrier member part by means of a liquid jet which stands under a high pressure. The liquid jet is directed against the nuclear fuel, and the pressure of the liquid is set so high, that the nuclear fuel which adheres to the support member is completely removed. The liquid jet finds the transition from the ceramic nuclear fuel to the metallic support member material such that, even at a swelling of the fuel rod, and deformation of the support member part, there is achieved an efficient detaching of the nuclear fuel. The metallic support members or support member parts hereby remain intact and are segregated after the washing off of the nuclear fuel. Only the nuclear fuel fragments are introduced into the chemical solvent.

5 Claims, 2 Drawing Figures

PROCESS AND ARRANGEMENT FOR SEPARATING CERAMIC NUCLEAR FUELS FROM METALLIC CASING OR SUPPORT MEMBERS

BACKGROUND OF THE INVENTION

1. Field of the Invention

The present invention relates to a process for separating ceramic nuclear fuels out of metallic support members or support member parts in which the nuclear fuels adhere, especially subsequent to the burning down of the nuclear fuels in nuclear reactors.

The nuclear fuels are to be stripped from their support components, especially prior to the reconditioning of the nuclear fuel in reconditioning facilities. For example, employed as the support components are tubular jackets or casings constituted of zircaloy, into which there are filled the ceramic nuclear fuels, which as needed, are encompassed by ceramic casing materials. The nuclear fuels must, before anything, be separated from these support components prior to their reconditioning, so that the nuclear fuel will not be contaminated during its reconditioning by metallic residues of the support components.

2. Discussion of the Prior Art

It is known, preceding the chemical dissolution of the nuclear fuels in solvents, to mechanically cut the fuel elements into segments or, for instance, also through the intermediary of a water jet, is disclosed in German Laid-Open Patent Application No. 30 07 876. The thusly obtained fuel element pieces are thereafter introduced into the solvent, and the nuclear fuel is dissolved out of the remaining support member parts in boiling nitric acid. This process is connected with relatively low technological requirements. However, in general, there must be taken into consideration the need for lengthy leaching periods, inasmuch as the chemical dissolution at the attacking surfaces which are only obtained through the shearing or cutting, requires a long timespan for the action of the nitric acid. During the dissolution of the nuclear fuels in nitric acid, the metallic tubular jacket parts which are constituted of zircaloy will remain essentially intact.

However, difficulties are encountered during the dissolution of thorium-containing nuclear fuel. For the dissolving such nuclear fuels, fluoride ions are added to the nitric acid, so as to produce an attack on the metallic support member parts. The metal which, as a result, goes into solution, adversely affects the subsequently effected chemical reconditioning steps.

In the mechanical separation between metallic support members and ceramic nuclear fuels, it has heretofore been unsuccessful to separate metallic parts and ceramic material without encountering any difficulties. This, above all, is impossible when the tubular jackets or carrier members evidence damage after the burning down of the nuclear fuels, such as deformations, swellings, fissures, or the like. The separated aggregates are subject to a high degree of wear and the demands on apparatus is quite extensive. The formation of radioactive dusts or released gaseous radioactive products present further problems in the holding back of radioactive materials and during the decontamination. Thus, for example, during the processing of support members constituted of zircaloy, it is not permissible to form fine metal particles, since this can lead to the dangers of conflagration and explosion. Because of the same reason, high temperatures must also be avoided during the processing of the fuel elements.

SUMMARY OF THE INVENTION

Accordingly, it is an object of the present invention to provide a process for separating ceramic nuclear fuels out of support members, in which it is possible to achieve a recovery of the nuclear fuel without contamination by the support member material, and through the utilization of only a few process steps. The process should be effected in the absence of the formation of any dust, and be simple to carry out. Moreover, the process should be implementable in a flexible manner with respect to variable dimensions of the fuel elements and damage to the fuel elements.

The foregoing object is achieved through the intermediary of a process of the above-mentioned type in which the ceramic nuclear fuels are washed off from the support member or carrier member part by means of a liquid jet which stands under a high pressure. The liquid jet is directed against the nuclear fuel, and the pressure of the liquid is set so high that the nuclear fuel which adheres to the support member is completely removed. The liquid jet finds the transition from the ceramic nuclear fuel to the metallic support member material such that, even at a swelling of the fuel rod and deformation of the support member part, there is achieved an efficient detaching of the nuclear fuel. The metallic support members or support member parts hereby remain intact and are segregated after the washing off of the nuclear fuel. Only the nuclear fuel fragments are introduced into the chemical solvent.

Preferably, the nuclear fuel is washed off from the metallic support members or the support member parts while in an immersed condition below the fluid surface of a liquid bath. Hereby, the disintegration and washing out of the ceramic material through the intermediary of the liquid jet is based on cavitation wherein, as the result of the implosion of vapor bubbles in the liquid jet, there will be generated shocks at high pressure and high frequency. This high dynamic loading attacks the brittle ceramic material; however, will evidence practically no effect on the relatively ductile metallic jacketing or support material. In the gaseous, as well as within the liquid medium, of significance with regard to the effectiveness of the liquid jet is its cross-section and the fluid pressure.

A minimum diameter and a minimum pressure is required in conformance with the nature and degree of adhesion of the nuclear fuel, in order to completely strip off the ceramic material from the support member or the support member parts. The minimum diameter and the minimum pressure are determined empirically.

The invention further contemplates the provision of an arrangement for the implementation of the process, especially for rod-shaped fuel elements in which the ceramic nuclear fuel is embedded in tubular jackets. The arrangement includes a holder for the metallic tubular jackets or the tubular jacket parts, which are obtained through shearing, and is equipped with one or more liquid jet nozzles, which serve to effect the washing off. In order to introduce the liquid jet nozzles into the tubular casings or packets, the nozzles are fastened on a lance which is introduceable into the hollow space formed in the tubular jackets during the washing out of the ceramic material. The lance can be arranged so as to be rotatable, or the liquid jet nozzles can be rotatably supported on the lance, and preferably arranged eccentric relative to the axis of rotation, whereby there is achieved a more intensive washing action over the entire cross-section of the nuclear fuel and the tubular casing or jacket.

BRIEF DESCRIPTION OF THE DRAWINGS

The invention is now detailed hereinbelow on the basis of an exemplary embodiment as is schematically illustrated in the accompanying drawings; in which.

DETAILED DESCRIPTION

Figure 1:
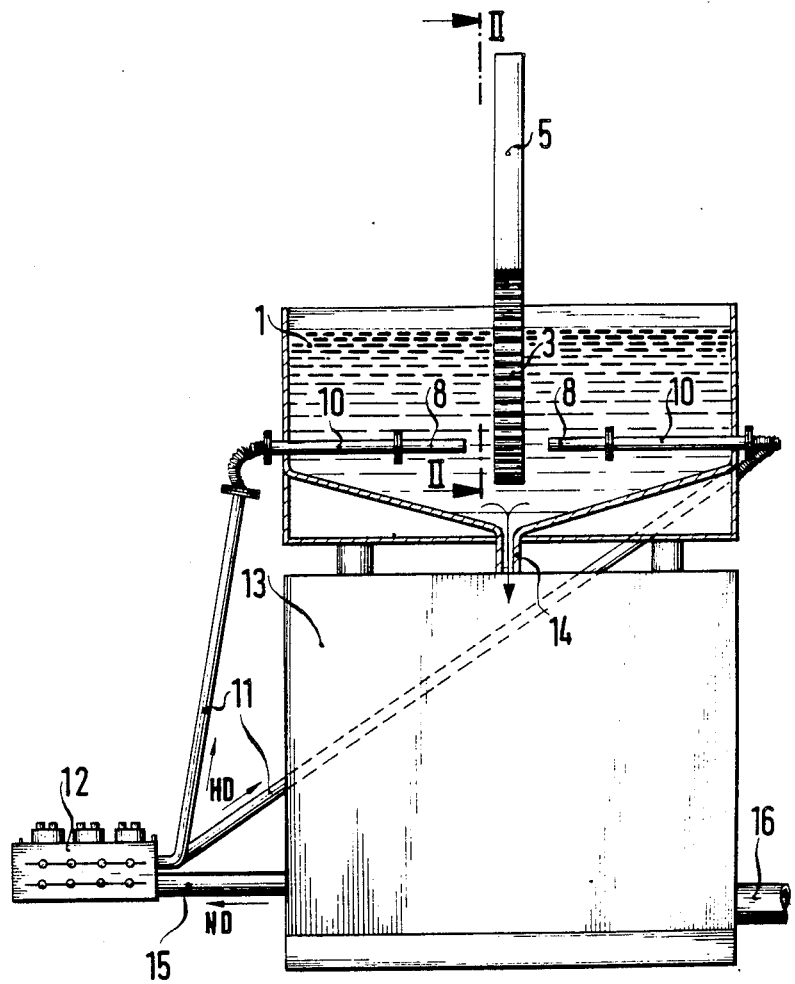
FIG. 1 shows a washing facility for separating ceramic nuclear fuels out off support member parts.

As can be readily ascertained from FIG. 1 of the drawings, pursuant to the exemplary embodiment, proceed in an immersion tank 1 are tubular jacket pieces 2 which are obtained by cutting or shearing, such as the support member parts of rod-shaped fuel elements. The tubular jacket pieces 2 are filled with ceramic nuclear fuel. The ceramic material adheres at least partially, especially after the burning down of the nuclear fuel, to the tubular jacket. In the exemplary embodiment, for purposes of testing the arrangement, ceramic-simulating material was fixed in position through the use of a two-component adhesive in a tubular jacket part constituted of zircaloy. By means of the adhesive there were reached adhesive bonding strengths between the ceramic material and the tubular jacket pieces which substantially exceeded the actually encountered adhesive strengths encountered after the burning down of the fuel elements in a nuclear reactor.

Figure 2:
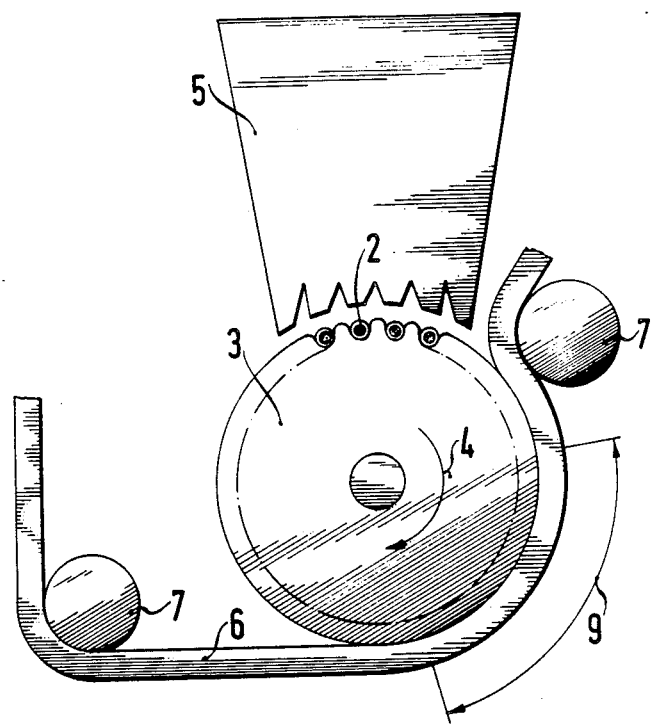
FIG. 2 illustrates a fragmentary section of the washing facility of FIG. 1 taken along section line II—II.

The tubular casing or jacket pieces 2 are introduceable into the immersion tank 1 through the use of a remotely-controllable arrangement. Adapted to this purpose is a revolving turret magazine 3 which, for example, is illustrated in a side view in FIG. 2 of the drawings, and in the exemplary embodiment, can be rotated about it axis in the direction of rotation 4. The tubular jacket pieces can be mounted on the circumference of the revolving turret magazine 3 when received from a supply hopper 5, and are fastened thereon. The revolving turret magazine, in the exemplary embodiment, is advanced stepwise by means of a conveyor belt or a drive chain 6, which is tensioned over guide rollers 7. The revolving turret magazine hereby conducts the tubular casing or jacket pieces 2 into the region of the fluid or liquid jet nozzles 8 which are arranged below the liquid surface in the immersion tank 1 within a processing zone 9. In the exemplary embodiment, the liquid jet nozzles are each fastened on two lances 10 which are mounted so as to insertable from both ends of the tubular jacket piece 2 into the tubular jacket piece. However, pursuant to a modification of the exemplary embodiment, a plurality of liquid jet nozzles can be arranged on each of the lances. The liquid jet nozzles can be mounted so as to be rotatable on the lances, or the lances themselves can be rotatable. Moreover, the liquid jet nozzles can be arranged eccentrically relative to the axis of rotation.

In the exemplary embodiment, the lances 10 concurrently serve as water inlet conduits and are connected to pressurized water-conveying pressure lines 11. The pressure lines 11 are supplied by an electrically-driven fluid pump 12. Located below the immersion tank 1 is a collecting tank 13 for the material which is washed out from the support member parts through the intermediary of the washing liquid. The washed out material and the washing liquid flow out through a central opening 14 in the bottom of the immersion tank into the collecting tank 13. Through an overflow 15 on the collecting tank 8, the washing liquid is conveyed in a closed flow circuit. The overflow 15 is provided with a strainer which will hold back the ceramic fragments in the collecting tank 13. The fragments which remain slide, together with liquid remainder in the collecting tank, towards a discharge 16, and from there are pumped into the chemical solvent for the nuclear fuels (not shown).

In the illustrated exemplary embodiment, the liquid jet nozzles, which are supplied with pressurized water, each possesses a diameter of 1.8 mm. The water pressure consists of 750 bar. The ceramic material in the tubular jacket parts, which is 200 mm in length was worked out at a nozzle distance of about 50 mm by the action of the cavitating water jet within about 30 seconds. When the diameter of the liquid jet nozzles or the water pressure is reduced, then at the other conditions being unchanged, there are required lengthier washing out periods. Thus, at a reduction in the diameter of the liquid jet nozzles to 1.6 mm, or at a reduction of the water pressure to 650 bar, the treatment period, in contrast with the previously discussed exemplary embodiment and under otherwise same conditions, is approximately twice as long.

The particle sizes of the ceramic materials obtained during this treatment range between 1 mm and 5 mm. Material residues were no longer present in the tubular jackets after the treatment of the simulated fuel element pieces with underwater jet nozzles.

As the working liquid and process medium, there can also be employed the acid which is utilized in the solvent. Independently of the materials for the washing facility and liquid jet nozzles which are to be selected, and must be constituted so as to be resistant to corrosion by acids, this possibility comes into question because of the reasons set forth in the introduction, only with the use of $UO_2$ or $PuO_2$ fuels.

What is claimed is:

1. In a process for separating ceramic nuclear fuels out of metallic tubular support members or tubular support member parts within which the nuclear fuels adhere comprising:
   immersing in a tank containing liquid the tubular support member or tubular support member parts with the nuclear fuel adhered thereto;
   inserting a liquid jet nozzle into the internal space of said tubular support member or tubular support member parts;
   directing a high pressure liquid jet against the ceramic fuels for effecting then fragmentation; and
   washing off the nuclear fuel while in the immersed condition with said high-pressure liquid jet.

2. The process as claimed in claim 1 comprising a lance having at least one said liquid jet nozzle arranged thereon.

3. The process as claimed in claim 1, wherein said at least one liquid jet nozzle is rotatably mounted.

4. The process as claimed in claim 1, wherein said lance is rotatably mounted.

5. The process as claimed in claim 1, wherein said at least one liquid jet nozzle is eccentrically arranged relative to its axis of rotation.

* * * * *

UNITED STATES PATENT AND TRADEMARK OFFICE
CERTIFICATE OF CORRECTION

PATENT NO. : 4,705,575

DATED : November 10, 1987

INVENTOR(S) : Rudiger Koch

It is certified that error appears in the above-identified patent and that said Letters Patent is hereby corrected as shown below:

Column 4, line 57, Claim 3: "claim 1" should read as --claim 2--

Column 4, line 50, Claim 4: "claim 1" should read as --claim 2--

Column 4, line 54, Claim 5: "claim 1" should read as --claim 3--

Signed and Sealed this

Twenty-sixth Day of July, 1988

Attest:

DONALD J. QUIGG

Attesting Officer     Commissioner of Patents and Trademarks